United States Patent [19]

Parker et al.

[11] Patent Number: 4,829,447
[45] Date of Patent: May 9, 1989

[54] BYPASS CONTROLLER AND BYPASS SYSTEM

[75] Inventors: Jeffrey L. Parker; Edward Parker, both of Jacksonville, Fla.

[73] Assignee: Parker Electronics, Inc., Jacksonville, Fla.

[21] Appl. No.: 64,540

[22] Filed: Jun. 22, 1987

[51] Int. Cl.⁴ ............................................. F25B 29/00
[52] U.S. Cl. ...................................... 364/505; 165/22; 236/1 B
[58] Field of Search .................. 236/49 A, 49 B, 49 C, 236/49 D, 49 R, 1 C, 38, 92 R, 91 R, DIG. 8, 1 B; 165/13, 14, 16, 22, 36, 27, 12, 22; 364/145, 557, 505

[56] References Cited

U.S. PATENT DOCUMENTS

| | | | |
|---|---|---|---|
| 4,386,649 | 6/1983 | Hines et al. | 165/25 |
| 4,388,692 | 6/1983 | Jones et al. | 364/557 |
| 4,406,397 | 9/1983 | Kamata et al. | 236/1 B |
| 4,489,881 | 12/1984 | Dean et al. | 236/49 R |
| 4,523,715 | 6/1985 | Ohsawa et al. | 236/49 D |
| 4,530,395 | 7/1985 | Parker et al. | 165/16 |
| 4,646,964 | 3/1987 | Parker et al. | 236/1 B |
| 4,682,279 | 7/1987 | Watabe | 364/141 |
| 4,683,939 | 8/1987 | Levine | 165/26 |
| 4,716,957 | 1/1988 | Thompson et al. | 236/49 D |
| 4,718,021 | 1/1988 | Timblin | 364/505 |
| 4,738,116 | 4/1988 | Himeno et al. | 236/49 |

FOREIGN PATENT DOCUMENTS 0272546 12/1986 Japan .................... 236/49

Primary Examiner—Parshotam S. Lall
Assistant Examiner—Ellis B. Ramirez

[57] ABSTRACT

A microcomputer-controlled bypass controller for use in maintaining a minimum airflow through a heating-/cooling unit and limit the static pressure in the supply air truck duct. The bypass controller functions to control the operation of a bypass damper which regulates the airflow through a duct that bypasses air from the supply truck duct to the return. The bypass controller also measures the air flow via an air flow sensor and communicates with a microcomputer-controlled thermostat to coordinate transitions between heating and cooling cycles in association with a second sensor which monitors the duct temperature.

21 Claims, 9 Drawing Sheets

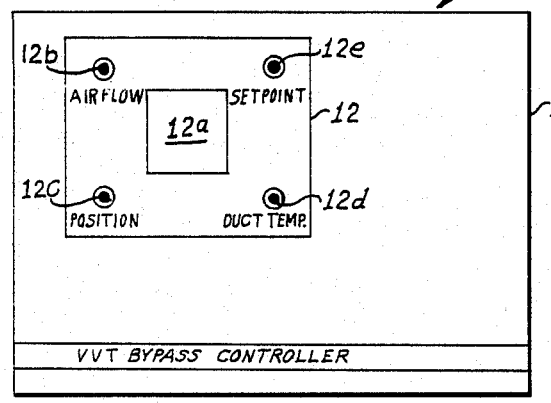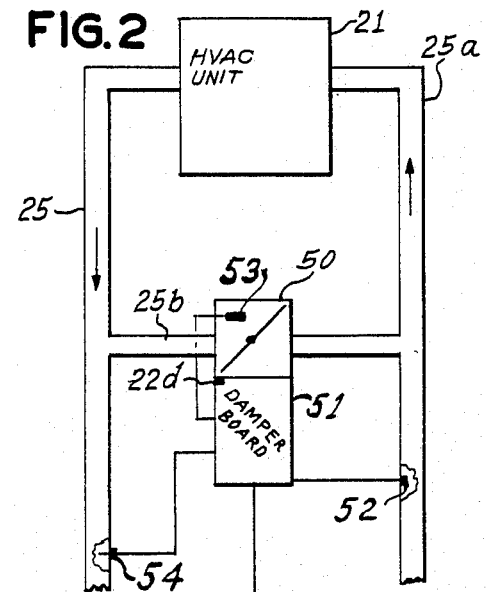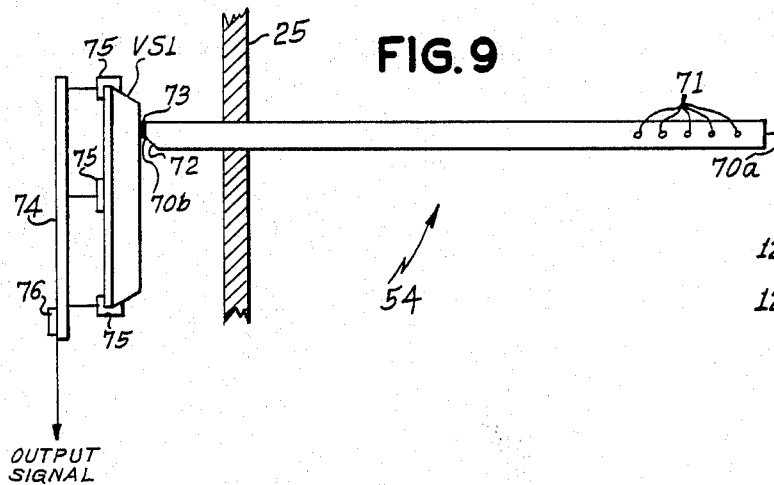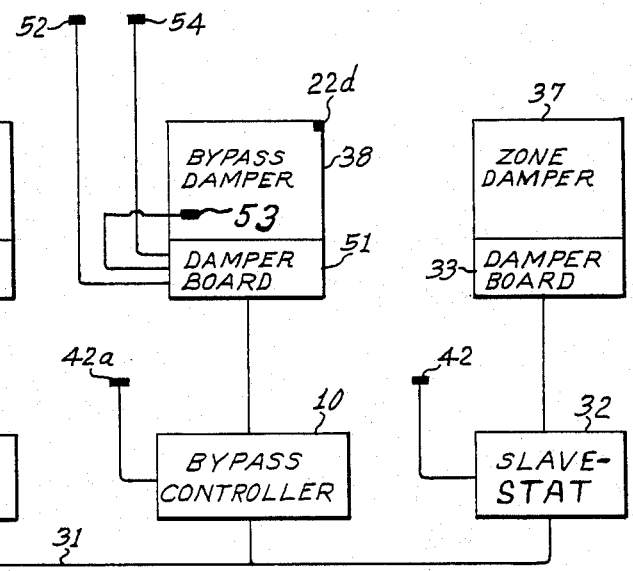

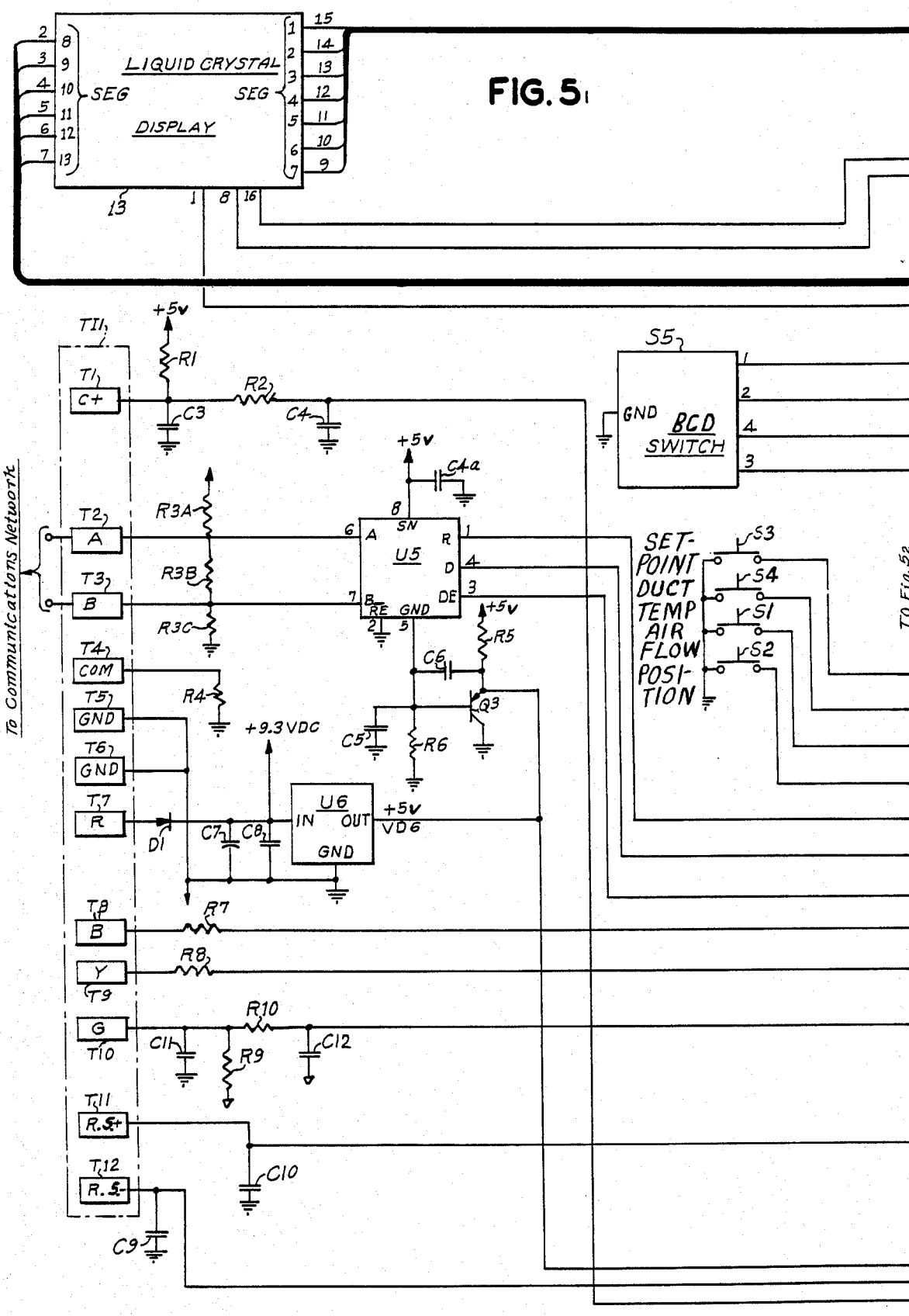

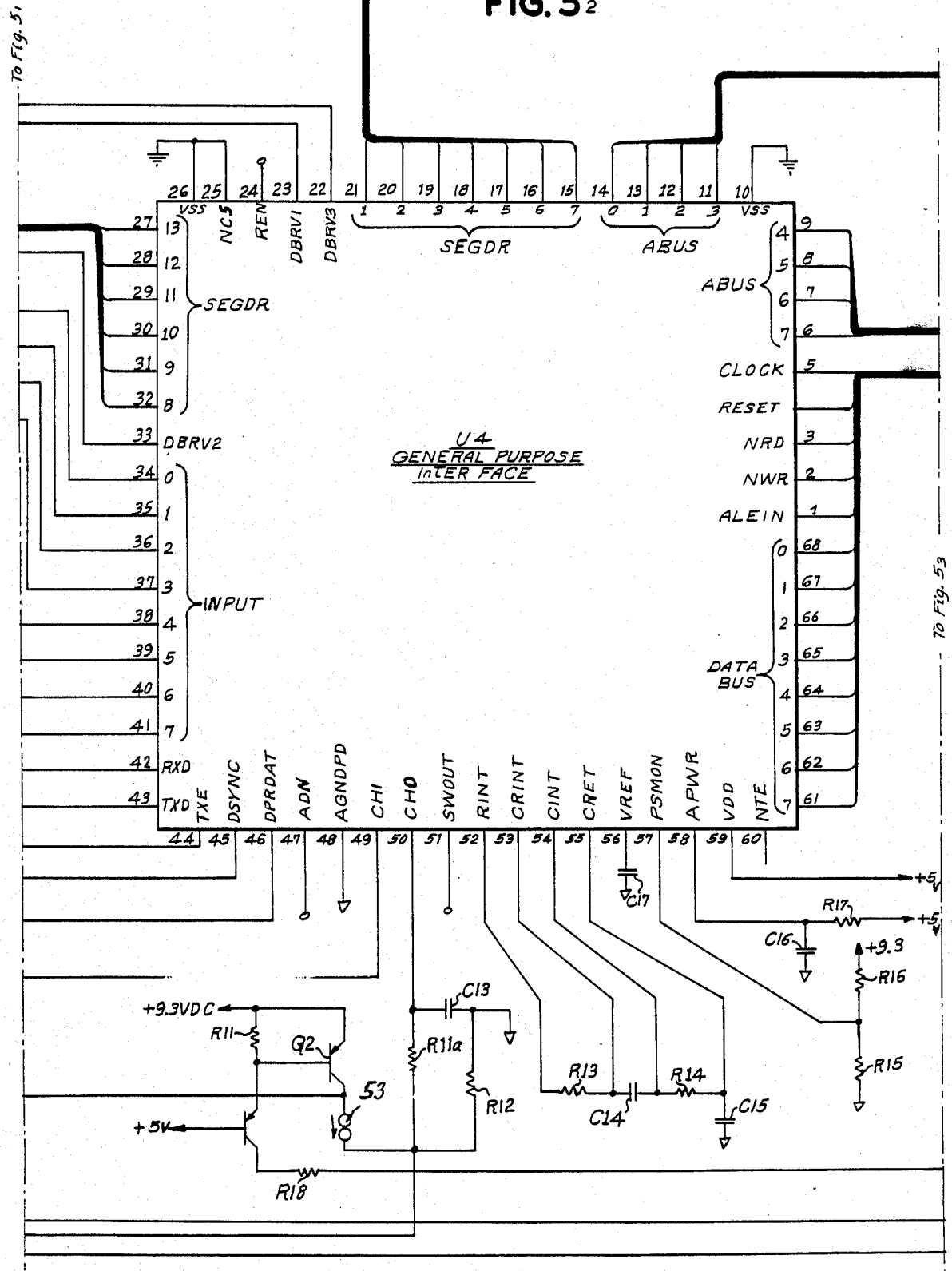
FIG. 5₂

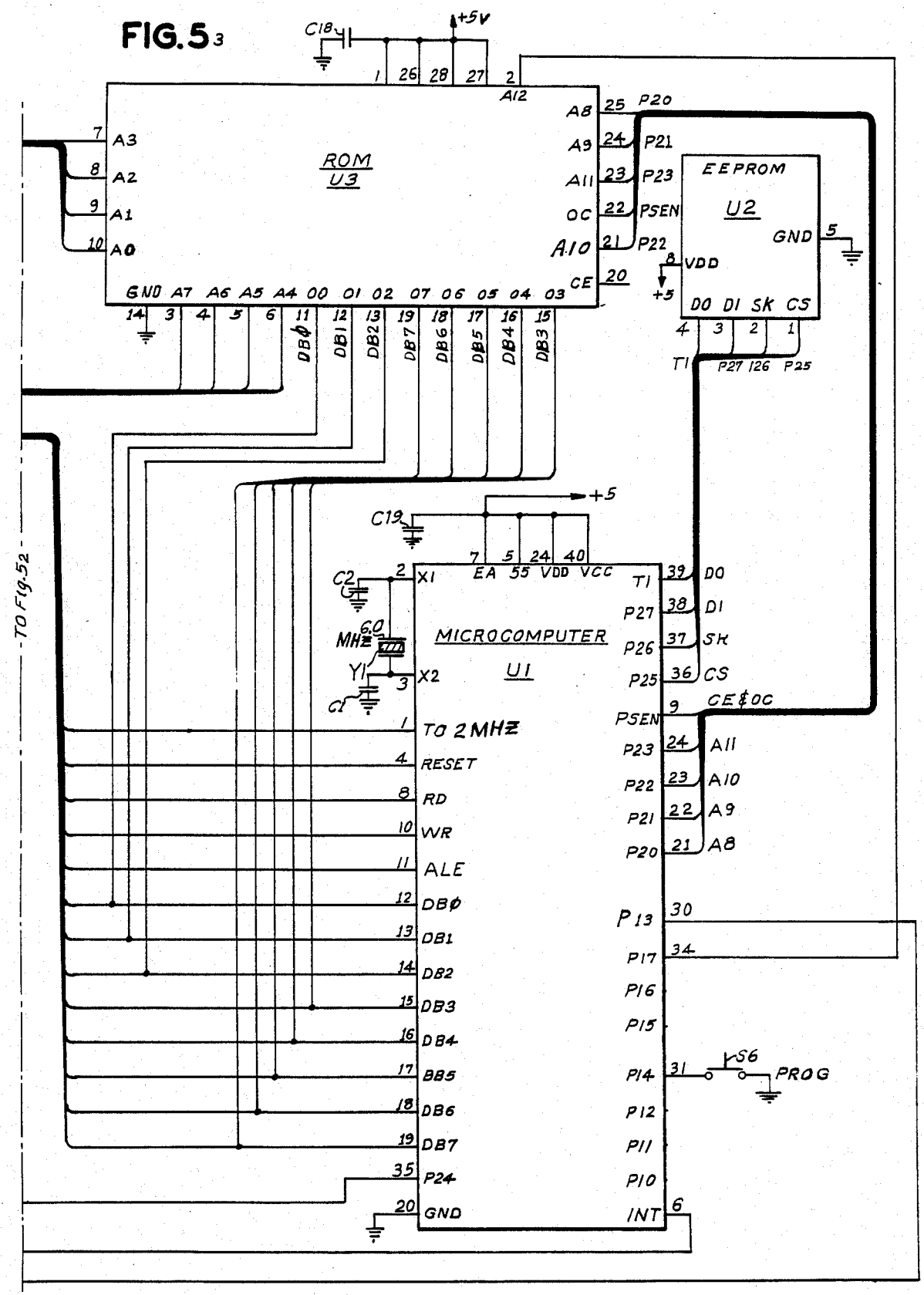
FIG. 5₃

BYPASS CONTROLLER AND BYPASS SYSTEM

RELATED U. S. APPLICATIONS

The following copending applications are to be considered herein:

Thermostat, Ser. No. 013,868, Feb. 12, 1987; Thermostat Control System, Ser. No. 013,869, Feb. 12, 1987; Method And System For Controlling A Single Zone HVAC Supplying Multiple Zones, Ser. No. 013,870, Feb. 12, 1987.

FIELD OF THE INVENTION

The present invention relates to the field of control devices and methods for use with heating, ventilation, and air conditioning (HVAC) units and particularly to air flow and pressure regulating control devices.

PRIOR ART

The present invention relates to microcomputer-controlled bypass controllers for use in controlling the air flow and pressure in a trunk duct. One of the principal difficulties associated with using dampers to bypass air to the HVAC unit and thus maintain proper air flow is the need to coordinate the operations of the bypass controller with the operation of the HVAC unit and the dampers associated with several zones. As dampers are closed in several zones the bypass controller should open sufficiently to bypass air to maintain system static air pressure within predetermined limits.

In our copending applications there is disclosed (A) a thermostat which can be programmed as either a master thermostat control or a slave thermostat control; (B) the combination of the thermostat with a damper control logic circuit for operation of the damper and the HVAC unit; and (C) a system which employs a master thermostat control with one or more slave thermostat control devices. The thermostats are microcomputer-controlled devices that communicate with each other. The thermostats may be timed-based via a real time clock and also employ sensors for monitoring the temperature in each zone and in the branch duct that supplies air to each zone. A bypass controller in accord with this invention must be able to coordinate its operation with the master and slave thermostats in the system. Furthermore, the bypass controller must have the ability to support sensors for measuring air flow, temperature and so forth.

One method of providing a bypass controller is disclosed in U.S. Pat. No. 4,487,363 (Parker, et al.). This device utilizes a microprocessor system which receives and assesses information from a fan motor which is indicative of the air flow through the system. Information developed by the bypass controller is supplied to a central monitor device that controls the system HVAC unit in response to data derived from zone thermostats.

The present invention provides a bypass controller that interfaces with improved microcomputer-controller thermostats to provide improved control over the system air flow. The present invention also provides for additional control over the system during a changeover from a heating cycle to a cooling cycle and vice versa. The present invention employs a microcomputer controlled bypass controller containing computer programs in read only memory. It is believed that the system and methods in accord with this invention which allows for control of a single HVAC utilizing master/slave thermostats in lieu of central control units together with the improved bypass controller represents a substantial departure from any prior art.

FEATURES OF THE INVENTION

Principal features of the invention include a microcomputer controlled bypass controller wherein the microcomputer is supplemented by (1) an electronically erasable programmable read only memory (EEPROM) through which temperature settings and other parameters can be stored and (2) a read only memory (ROM) containing control algorithms in the form of instruction codes and fixed data for system operation, data display, and asynchronous communication to an external communications bus. Programming many operations of the bypass controller is accomplished through a program switch to the microcomputer and a general purpose interface (GPI) also having data input switches.

The controller also has interface circuitry to receive inputs in the form of data and control signals and output signals from local and remote temperature detectors and by way of input ports.

A damper control board contains circuitry to route operating signals from the microcomputer of the controller to the damper motor, and to an analog sensing device such as outlet duct and return air temperature and air flow detectors. The circuitry in the damper control board also enables duct temperature sensor and a damper travel limit sensor of the damper blade within the damper.

SUMMARY OF THE INVENTION

In accordance with the present invention, a system provides conditioned air from a single HVAC unit to a plurality of zones through a duct system having a motor operated zone damper, associated with each zone, which modulates open and closed in response to its zone thermostat, the HVAC unit including a fan for discharging conditioned air into the outlet of the HVAC unit. A bypass duct communicates between the outlet and return air intake of the HVAC unit and a motor operated bypass damper disposed in such bypass duct has a damper blade movable between opened and closed positions and intermediate positions therebetween. A programmable bypass controller is connected to the motor of the bypass damper for controlling the operation of the bypass damper and thereby the movement of the blade thereof to selected positions. Means are included for communicating between at least one zone thermostat and the programmable bypass controller for selectively operating the bypass controller and its damper. A sensor is located in the air outlet of the HVAC unit downstream from the bypass duct and communicates with the bypass controller for providing information indicative of the air flow in the duct system. The bypass controller controls the motor of the bypass damper to move its damper blade more open to correspondingly compensate for the increase in the air flow in the duct system caused by one or more of the zone dampers modulating closed for diverting more air from the HVAC outlet to the HVAC inlet and thereby maintaining the air supplied by the HVAC unit to the duct system downstream from the bypass duct generally constant. The bypass controller also includes means indicative of the status of the air flow through the duct system and the position of the damper blade of the bypass damper.

The bypass controller has a plurality of programs and a data base, and the bypass controller is responsive to the programs and the data base for its operation. The bypass controller includes a microcomputer, and the sensor provides information indicative of the amount of air flow in the duct system to the microcomputer. The microcomputer analyzes the information in conjunction with the programs and the data base prior to providing control signals to the bypass damper to modulate the damper blade toward opened or closed positions or intermediate positions therebetween in response to the air flow data.

A second sensor is located in the bypass damper, preferably on the ingress side thereof, for determining the temperature in conjunction with its programs and its data base prior to providing control signals to the bypass damper to modulate the damper blade toward opened or closed positions or intermediate positions therebetween in response to the duct temperature data and in response to data received from the zone thermostat that the operating mode of the HVAC unit will be changed by the thermostat or some other means associated therewith.

In further aspects the invention includes a method of monitoring and controlling the amount of air recirculated through a bypass duct having a motor operated bypass damper therein between the supply and return ducts of a single HVAC unit supplying air downstream therefrom to a plurality of zones through a duct system having a motor operated damper in each zone controlled by a thermostat, wherein the method has the following steps: a. sensing the airflow in the duct system downstream of the bypass duct, b. converting the sensed airflow into signals, c. supplying the signals to a microcomputer, and d. controlling from the microcomputer in conjunction with its programs and the signals supplied to the microcomputer in step c. of the bypass damper to divert more or less air through the bypass duct to maintain the airflow supplied by the HVAC unit to the duct system downstream of the bypass duct and prior to any outlets to any zones generally constant. This method may include the following steps: e. supplying signals to the microcomputer indicative of a mode of operation for different than the present mode for the HVAC unit different than the present mode of operation, f. sensing the temperature of the air in the supply duct, g. converting the temperature data to signals, h. providing the temperature signals to the microcomputer, i. operating the motor of the bypass damper to a full open position until the supply duct temperature is within limits established by the programs of the microcomputer, and j. thereafter operating the bypass damper in accordance with step d. Step i. may include the step of: k. maintaining all dampers in the present mode until the bypass damper begins moving in accord with step j., and m. allowing all zone dampers to be positioned appropriately for the different mode.

When modes of operation of the HVAC unit are called for, i.e., from a heating mode to a cooling mode or from a cooling mode to a heating mode and the HVAC system is operating normally in monitoring and controlling the amount of air recirculated through a bypass duct having a bypass damper between the supply and return ducts o a single HVAC unit supplying air via the supply duct to a plurality of zones, the changeover method is accomplished with the following steps: a. determining that a first mode requirement of the HVAC unit has ended, b. determining that a second mode of the HVAC unit is required, c. positioning the bypass damper in the bypass duct full open until supply air temperature is generally in accord with the second mode, and d. moving the bypass damper to its selected positions during normal operation according to air flow requirements. Also the method may include the steps of: e. moving the bypass damper to its selected positions during normal operation according to air flow requirements, and f. allowing all zone dampers to be positioned appropriately for the second mode when step e. has begun.

Other aspects are seen to be provided by this invention in which the bypass controller includes first circuit means responsive to input signals for establishing operating limits for the bypass damper and providing a first digital word output signal representative of the operating limits. Second circuit means is responsive to input signals indicative of the air flow in the system for providing a second digital word output signal representative of the air flow therein. Third circuit means adapted to be coupled to a peripheral circuit means receives data from a peripheral circuit means and provides a third digital word output signal representative of the information contained in such data. Fourth circuit means responds to output signals from the first, second, and third circuit means for providing fourth digital word output signals for operating the control means of the bypass damper. Programmable logic means provides digital word input signals to the fourth circuit means for selectively controlling the fourth circuit means and logic means selectively operates the bypass damper control means in response to respective fourth digital word input signals from the fourth circuit means. Means for providing information to peripheral circuit means is included in the bypass controller, such information including any digital word signal associated with the first, second, and third circuit means and the programmable logic means.

The first sensor of the controller is located in the outlet duct of the HVAC unit downstream of the bypass duct for measuring the air flow in the outlet duct and providing an output signal representative of the air flow in the duct, said second circuit means including means responsive to the output signal from the first sensor for providing a second digital word output signal representative of the air flow in the outlet duct. The first circuit means includes means responsive to input signals for establishing the desired air flow in the outlet duct and providing a first digital word output signal representative of the desired air flow therein.

The fourth circuit means is selectively controlled by the programmable logic means for comparing a digital word representative of the air flow in the outlet duct and a digital word representative of desired air flow in the outlet duct for providing a digital word output signal to the logic means for operating the bypass damper to achieve actual air flow in the outlet duct substantially equal to the desired air flow in the duct. The second sensor, preferably located in the damper of the bypass duct, provides an output signal representative of the temperature in the outlet duct and the second circuit means is responsive to the output signal from the second sensor to provide a digital word output signal representative of the duct temperature. The fourth circuit means is selectively controlled by the programmable logic means and compares a digital word representative of actual temperature in the outlet duct and predetermined setpoints established by the first circuit means.

Further aspects herein relate to the programmable logic means having a first program means such that when a signal from a peripheral circuit means is received by the third circuit means indicative of operating the HVAC unit in a mode different from the existing mode of operation, the fourth circuit means provides a signal to the logic means to operate the bypass damper control means to position the bypass damper in the maximum open position until duct temperature is within the predetermined setpoints as established by the first circuit means and to then operate the bypass damper control means according to the desired air flow in the duct. The programmable logic means also includes a second program means such that when a signal from a peripheral circuit means is received by the third circuit means indicative that the fan associated with the HVAC unit has been turned off, the fourth circuit means provides a signal to the logic means to operate the bypass damper control means to position the bypass damper in the maximum open position when the fan is off and to then operate the bypass damper control means according to the desired air flow in the duct when the fan is operating.

Also, the bypass controller includes means for providing control signals to peripheral circuit means for controlling the operation of an HVAC unit and the fan associated with the HVAC unit. The programmable logic means includes program means such that the fourth circuit means provides control signals to the means providing control signals to peripheral circuit means for deactivating the heating and cooling functions of the HVAC unit, turning on the fan associated with the HVAC unit, and opening all zone dampers and causing the logic means to close the bypass damper. The fourth circuit means enters data indicative of the air flow in the duct system into the programmable logic means and provides control signals to the means providing control signals to peripheral circuit means for closing all zone dampers. The programmable logic means provides signals to the logic means for operating the bypass damper open for maintaining air supplied by the fan to the duct system downstream from the bypass duct generally constant during the aforesaid functions.

DETAILED DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the bypass controller in accord with this invention;

FIG. 2 is a pictorial diagram of the bypass controller used in this invention;

FIG. 3 is a pictorial diagram of the system in accord with the present invention;

Figure 6:
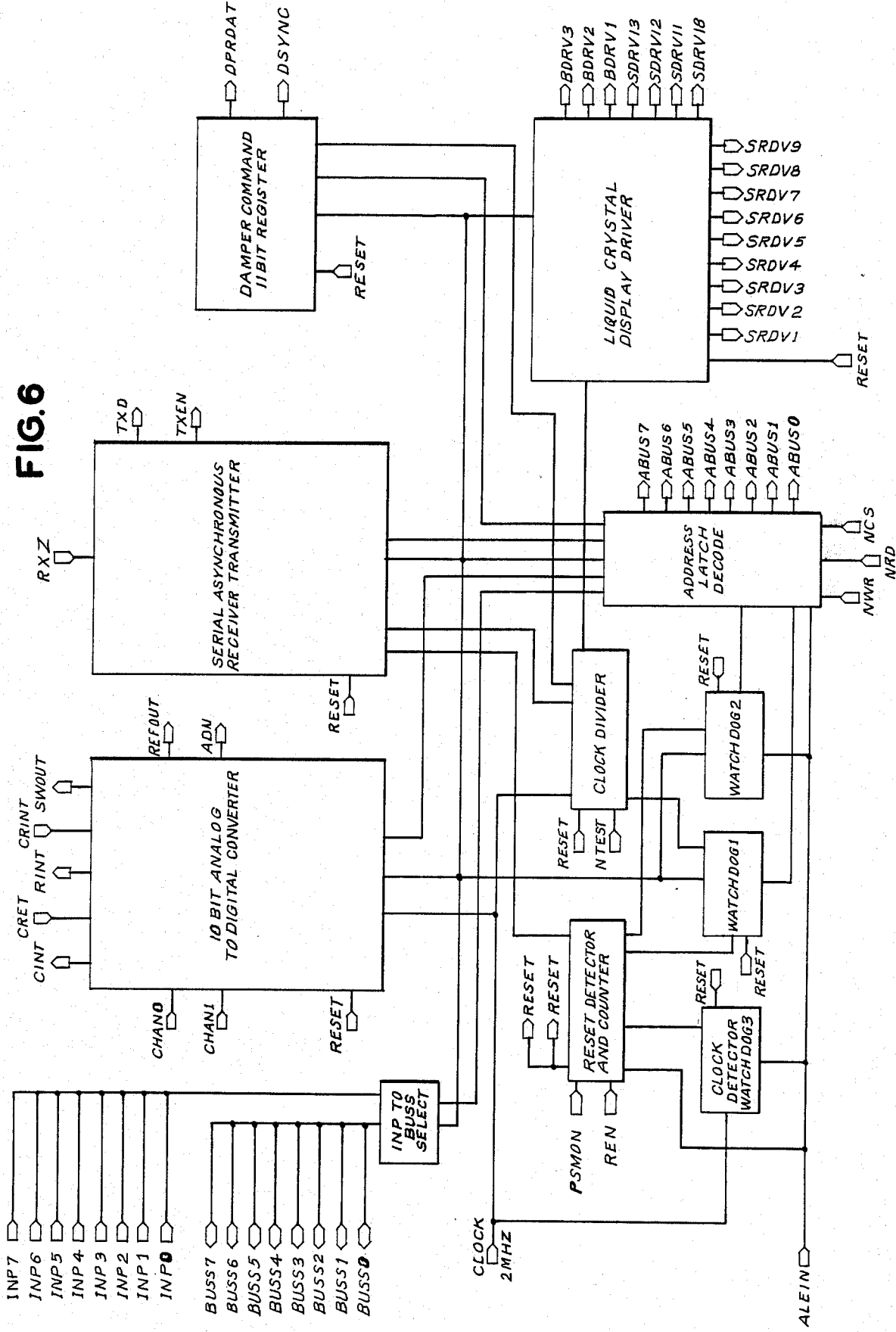
Figure 7:
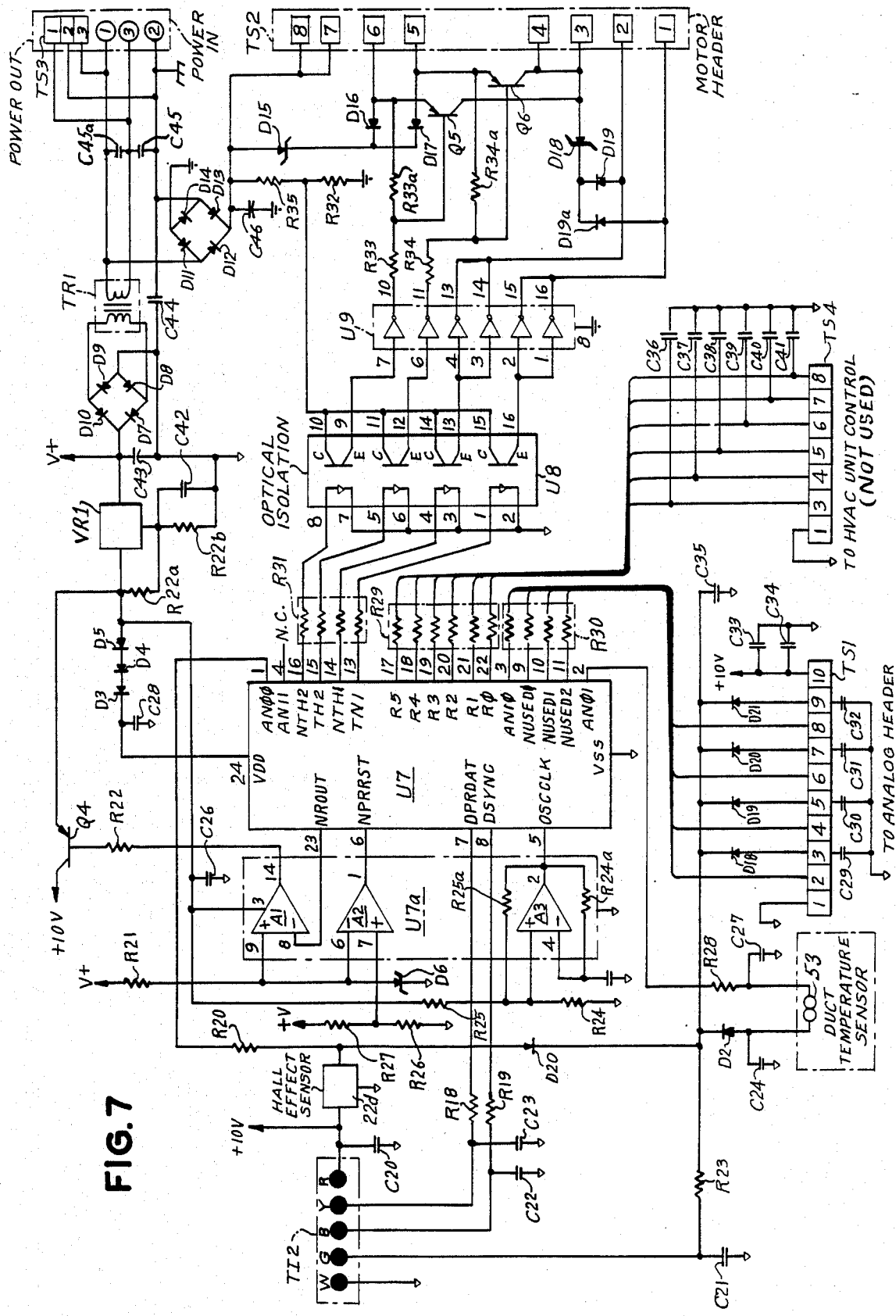
Figure 8:
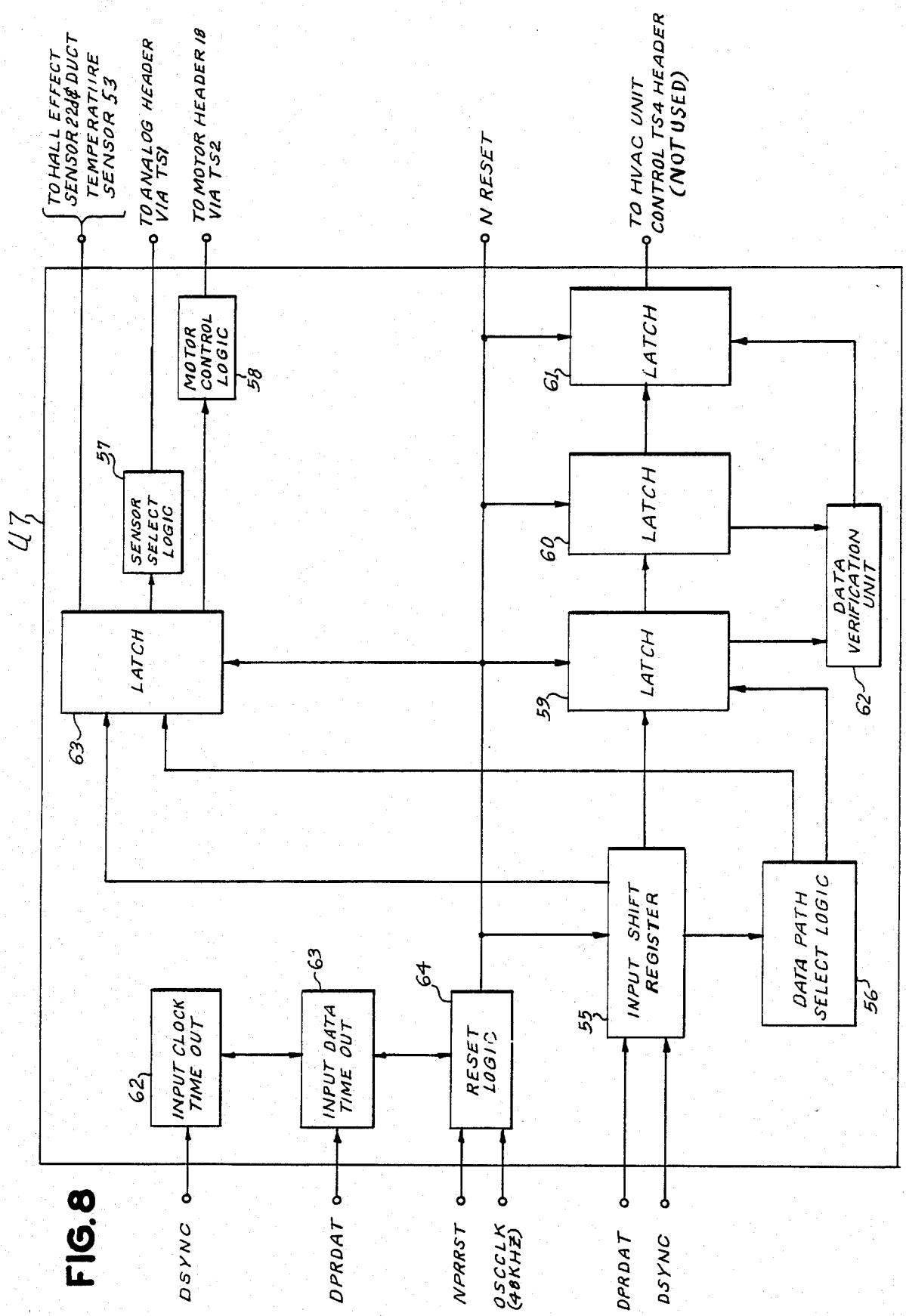
Figure 10:
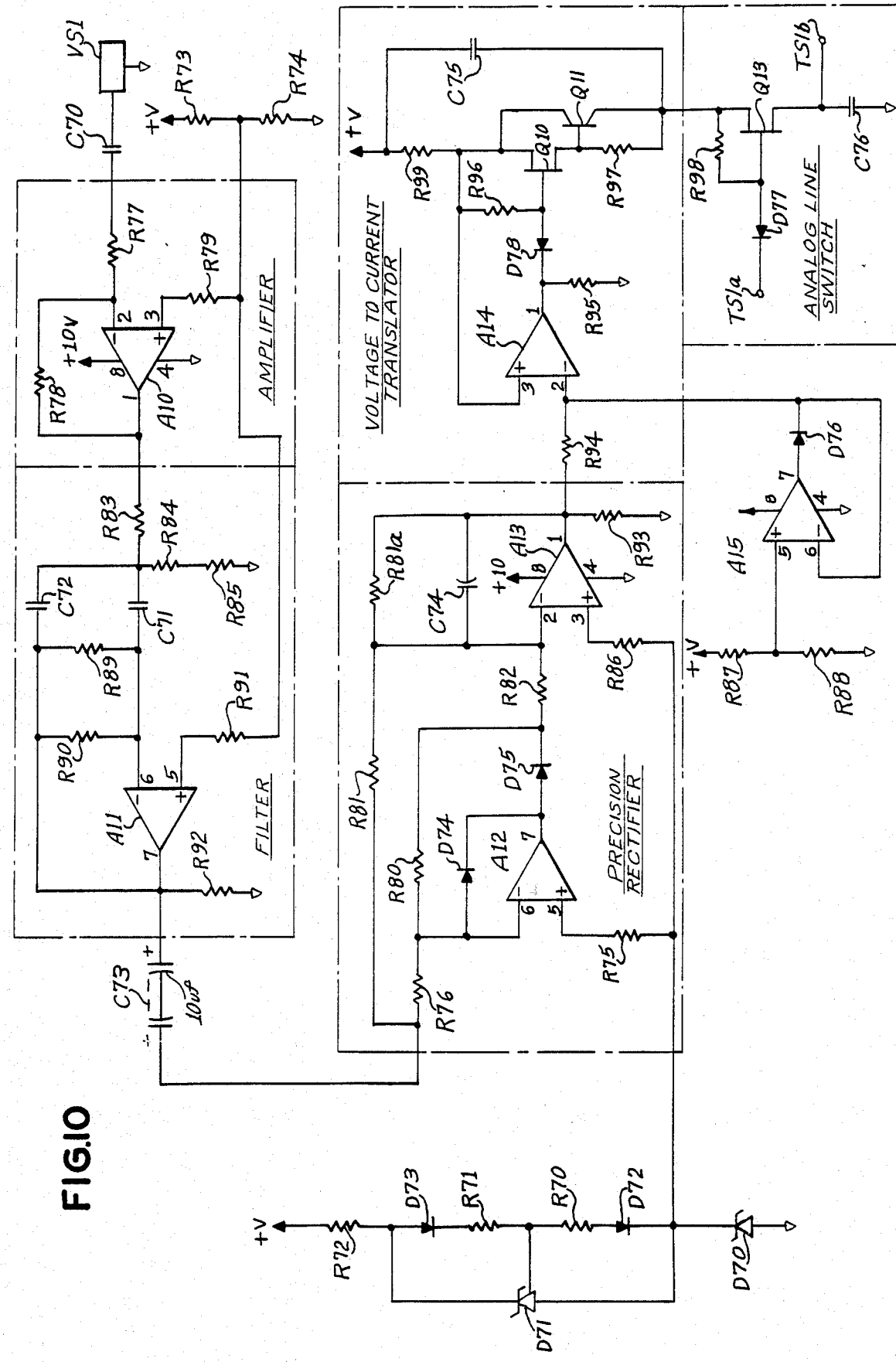

FIGS. 5 sub1 to 5 sub3 are detailed schematic diagrams of the circuitry employed in the bypass controller;

FIG. 6 is a functional block diagram of the general purpose interface used in the bypass controller;

FIG. 7 is a detailed schematic diagram of the circuitry of the damper control board;

FIG. 8 is a simplified functional block diagram of the central control circuit of the damper control board;

FIG. 9 is a pictorial diagram of the air flow sensing detector employed with the present invention; and FIG. 10 is a schematic diagram of the circuitry employed with the air flow sensor.

DETAILED DESCRIPTION OF THE PREFERRED EMBODIMENT

Referring now to the drawings, FIGS. 1-3 depict the bypass controller 10 according to this invention. The bypass controller system includes the bypass controller 10 and other components as described in detail hereinafter. In FIG. 3, a master control thermostat, monitor-stat 15, controls its own zone damper 20 and an HVAC unit 21 via damper control circuitry located on damper board 16. The monitor-stat 15 also communicates and provides control signals to one or more slave-stats 32 which control their own zone dampers 37 via their own damper boards 33. The monitor-stat 15 and the slave-stats 30-32 communicate via digital words by way of communications line 31. As discussed in the aforesaid applications entitled "Thermostat" Ser. No. 013,868, Feb. 12, 1987; "Thermostat Control Assembly" Ser. No. 013,869, Feb. 12, 1987; and "Method And System For Controlling A Single Zone HVAC Supplying Multiple Zones" Ser. No. 013,870, Feb. 12, 1987, the monitor-stat 15 and slave-stats 30-32 interact according to their own programming. In addition, the thermostats 15, 30-32 may be time based and have different set back times for non-occupied periods of a day or day(s) of the week with regard to their respective zones.

As shown in FIG. 2, the HVAC unit 21 supplies heated or cooled or ventilated air into main duct 25 and receives return air via duct 25a. As the dampers 20 and 37 are modulated closed during system operation, bypass damper 38 is opened to maintain air pressure in the duct network supplying the zones at a preset value. Bypass controller 10 controls bypass damper 38 via a damper board 51. As discussed more fully below, the thermostats 15 and 32 receive data from their own zone temperature sensors 30 and 42 respectively as well as other sensors that ar not shown herein. Sensors 22d, 42a, 52, 53 and 54 that are associated with bypass controller 10 will be discussed more fully hereinbelow.

As is understood in the art of heating, ventilating, and air conditioning systems, the sizing of the various ducts and dampers is a critical component of overall design. The HVAC unit 21 that supplies air to the system is chosen with total system demand in mind and, when one or more dampers supplying a zone are closed, excessive air pressure may result. This may cause a decrease in HVAC unit fan performance, excessive noise in the ducts and air diffusers and excessive air pressure being supplied to the various zones. Accordingly, methods have been devised to regulate the air pressure. The present invention is designed to provide an improved control means of bypassing air from the outlet duct 25 of a HVAC unit 21 via by-pass duct 25b into the return air duct 25a and performing same in coordination with the operation of the monitor-stat 15 and the slave-stat 32.

The damper boards 16, 33, and 51 illustrated in FIGS. 3, 7 and 8, contain the circuitry for operation of a given damper 20, 37 and 38 and, in the case of the monitor-stat 15, control interfacing for the HVAC unit 21. The damper board 51 used in association with bypass controller 10 is used for operation of the bypass damper 50 via a precision stepper motor and provides circuitry for selective enabling of analog sensors via signals from U1.

Referring now more specifically to the drawings, a bypass controller 10 used in the control system is shown generally at 10 in FIG. 1. The controller 10 has a removable front cover 11 and a front display panel 12 comprising a cutout section 12a for viewing a liquid crystal display 13 and four resilient portions 12b, 12c, 12d and 12e for the operation of four switches located below the cover 11, and shown in FIG. 4 as switches S1 for air flow, S2 for position, S3 for setpoint, and S4 for duct temperature. When any switch S1–S4 is depressed, the associated data is placed on display 13. Program switch S6 (located below cover 11) is used to read return air temperature if the sensor 52 is used, as shown in FIG. 2.

S5 is a sixteen position rotary switch which supplies a 4-bit binary coded decimal word to the input bus of U4. The use of the BCD word and switches S1–S4 allows for the creation of an 8-bit word.

Liquid crystal display 13 is a conventional tri-plexed display driven by U4 and is used for local indicating means for data display on the controller 10.

Figure 4:
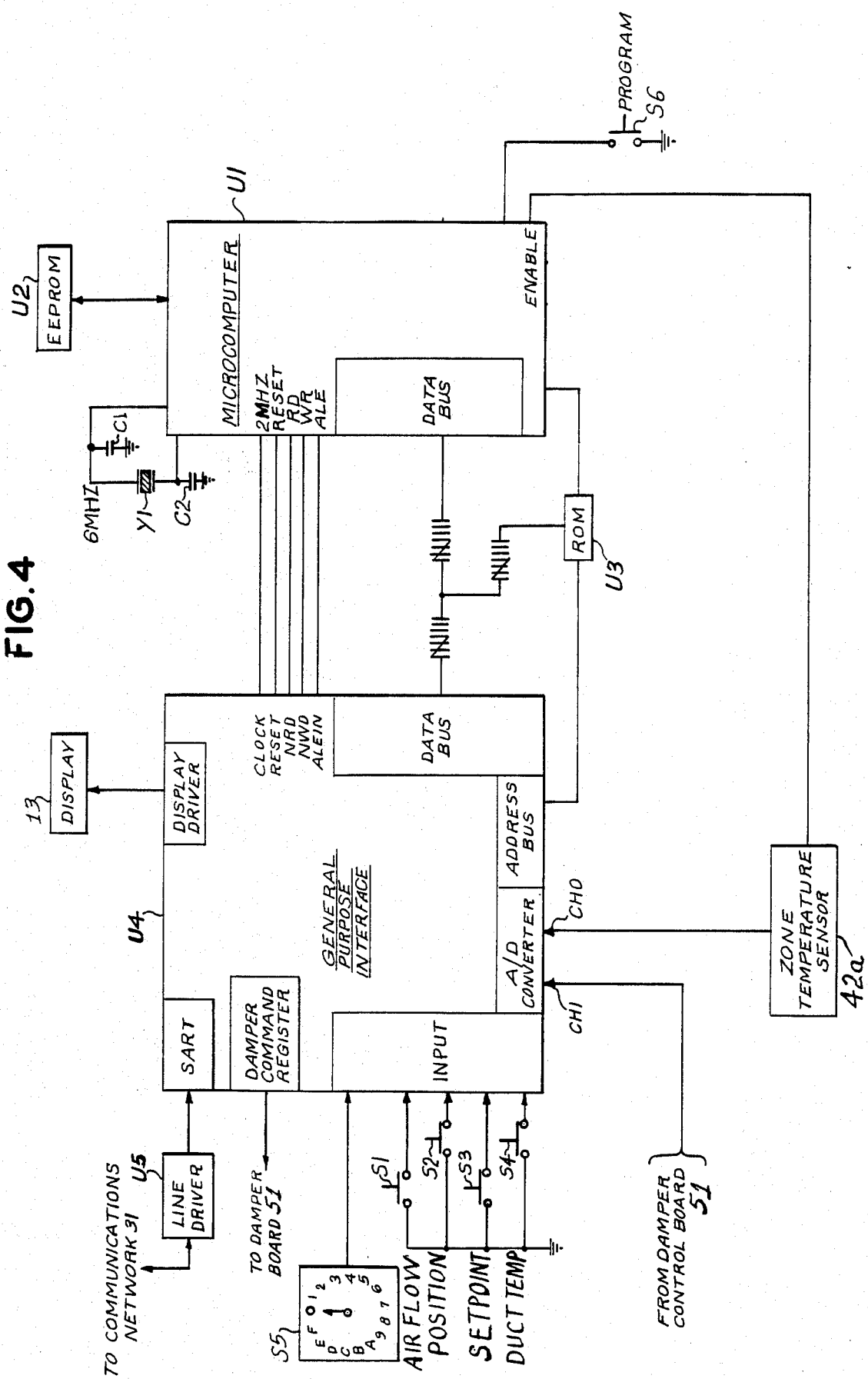
FIG. 4 is a simplified schematic diagram of the circuitry employed in the bypass controller.

Referring now to FIGS. 4 and 5, diagrams of the bypass controller 10 are illustrated. The controller electronics comprise a conventional microcomputer U1 clocked at 6 Mhz by way of crystal Y1 and capacitors C1 and C2. U1 has internal memory that is supplemented by programmable logic circuits consisting of a 256-bit electronically erasable programmable read only memory (EEPROM) U2 and read only memory (ROM) U3 which contains instruction codes and fixed data. U2 and U3 will be more fully explained hereinbelow.

General Purpose Interface (GPI) U4 provides for a number of interface circuits including a serial asynchronous receiver/transmitter (SART), a 10-bit A/D converter, a liquid crystal display driver, and other logic circuits which are combined in a 68-pin integrated chip for many reasons including space, expense, and reliability. The circuits in U4 are of conventional design and a functional block diagram of the GPI U4 is shown in FIG. 6.

In the preferred embodiment of the bypass controller 10, GPI U4 and microcomputer U1 are connected by thirteen lines: 8 data lines; an address latch enable (ALE); a write control ($\overline{WD}$); a read control ($\overline{RD}$); a reset line; and a clock output supplying 2 Mhz to U4.

The SART in GPI U4 is a conventional universal asynchronous receiver transmitter (UART) that operates at a single baud rate. The A/D converter receives input signals from sensors which supply a given current for a particular parameter. For example, the temperature sensors used provide a 1.0 ua/° k output signal. The air flow sensor 54 will be discussed in more detail hereinbelow. Collision avoidance for the communications network 49 is accomplished by load resistor R6 which monitors the current required by line driver U5. Q3 is turned on by line current through R6 and an interrupt (INT) signal is placed on ping of U1. Capacitor C5 and C6 filter noise which might otherwise result in false collision detection indications.

As seen in FIG. 5, a voltage divider R15 and R16 applies a signal to pin 57 of U4. When and if the voltage is too low, U1 is disabled by a signal on the reset line between U1 and U4. In addition, U4 receives timing data from U1. If the proper timing data is not received, U1 will be disabled via the reset line.

A description of the programming and operation of the bypass controller 10 will illustrate the unique features of the present invention.

PROGRAMMING THE BYPASS CONTROLLER

1. Set Address

In order for bypass controller 10 to communicate with a monitor-stat 15 it is necessary that each device have a specific address. The bypass controller is always given an address number one less than the monitor-stat 15 (which is given the highest number). The device address is entered utilizing switch S5 in position "1". Switches S1 (air flow) raises the number displayed in display 13; S2 lowers the number. The address is entered into U2 via U1.

2. Fahrenheit or Celsius Display

With S5 in position "2", switches S1 or S2 can be used to alternate the display 13 for "F" or "C". U3 contains a straight-forward algorithm for converting temperature data to either a Fahrenheit or Celsius readout.

3. Controller Lock

With S5 in position "3", either S1 or S2 can be depressed to toggle "on" or "off" on display 13. When the lock feature is "on" the features associated with switches S1–S4 and S5 are locked and cannot be changed. This presents inadvertent altering of setpoints and programs associated with the bypass controller 10.

4. Air Flow Sensor Setpoint

An airflow sensor 54 is used to measure the duct air flow output from the HVAC unit 21. This data is presented in "reference counts" rather than as a quantitative measurement. In position "4" of S5, the air flow reference counts is displayed on display 13. This value is the setpoint that the controller 10 is to maintain via bypass damper 50.

5. Sensor Calibration

Switches S1 and S2 can be used to adjust the calibration of the A/D circuitry which receives signals from various sensors. The calibration is accomplished using a reference thermometer. The A/D circuit supplies a 10-bit word for the temperature (2 bits for the most significant bit, MSB, and 8 bits for the least significant bit, LSB). A 2-bit calibration word, 1 bit for MSB, 1 bit for LSB, is entered in the U2 EEPROM for use in modifying the sensor word so that the reading on the display 13 is the same as that read on a reference sensor. This data is provided to U4. A calibration word placed in U2 will modify the A/D output signal representative of the data so that the exact calibrated data will be used in the circuitry. The calibration word is modified by S1 and S2 until the data displayed on display 13 is the same as that on the reference sensor.

A. Duct Temperature Calibration

The controller employs a duct temperature sensor 53. With S5 in position "5", S1 and S2 can be used to calibrate duct temperature in the manner discussed above.

B. Controller Temperature Sensor

The bypass controller 10 may be provided with a local temperature sensor 42a for measurement of the air temperature in the vicinity of the controller. With S5 in position "6", this sensor can be calibrated as described above.

C. Air Flow Sensor Calibration

The air flow sensor 54 is calibrated with S5 in position "7". With the HVAC unit 21 off, the display 13 should indicate between 0 and 5 counts. Switches S1 and S2 are used to set the data reading accordingly.

6. Controller Dead Band

The controller dead band is the number of reference counts that must change before the bypass damper 50 begins to modulate either open or closed. With S5 in position "8" the dead band can be set using S1 and S2. If, for example, the dead band is set at 15 counts and the reference air flow setpoint is 1000 counts, the damper 50 will begin to modulate open at air flow =1015 counts and to modulate closed at 985 counts.

7. Maximum Damper Position Limit

The maximum position for the damper 50 can be adjusted from between "60" which is 100% open to "15" (25% open). The maximum should be set for 60 (100% open) unless the damper 50 is considerably oversized in a given application. The display 13 will indicate the limit number with S5 in position "9". Switches S1 and S2 can be used to adjust the limit number as desired.

8. Changeover Cycle

After a heating cycle the bypass damper 50 is opened until duct temperature is below a "cooldown" setpoint. After a cooling cycle the bypass damper 50 opens until duct temperature is above the "warmup" setpoint. The changeover cycle is used to temper the residual conditioned air from the last cycle before delivering it to the various zones.

The rotary switch S5 is placed in position "A". "Cooldown" setpoint is set between 87° F.–72° F. using switches S1 and S2 and the switches S3 and S4 are used to adjust the "warmup" setpoint from 55° F.–70° F. The changeover cycle can be turned "on" or "off" by toggling the program switch S6.

The programs controlling the changeover cycle cause the various zone dampers 20, 37 to remain in their present mode while the changeover cycle is in effect. Once the bypass damper 50 begins to move in accordance with air flow setpoints, the zone dampers 20, 37 will be operated in accordance with their programming for the particular mode.

9. Auto Set

With the rotary switch S5 in "F", the display 13 will show "AS" (autoset) and "off". Program switch S6 is depressed to initiate auto set. Auto set adjusts the bypass controller 10 so that the bypass damper 50 modulates open as the first zone dampers 20, 37 modulate closed. After S6 is depressed the display 13 will indicate "on" and then the numbers 1, 2, 3 in that order indicating that the following functions are being performed in the order given: display of 1: heating and cooling functions of HVAC unit 21 off; fan associated with HVAC unit 21 on; all zone dampers 20, 37 open; bypass damper 50 closed. Display of 2: measure air flow in reference counts and enter the data as the air flow setpoint into the memory in U2. Display of 3: Zone dampers 20, 37 are closed and insure that the bypass damper 50 tracks properly.

In a stand alone calibration with no communication bus 31 in place, auto set is established manually by setting the zone dampers 20, 37 to establish a given air flow (measured in reference counts) read out on bypass controller display 13. The bypass controller count setpoint can be set to match the desired level.

In the preferred embodiment of the present invention, power is directed to the bypass controller 10 from the damper board 51, via a 12- conductor ribbon having terminals T1–T12 for power input and communications therebetween. Voltage regulator U6 is a conventional device for supplying a regulated +5 vdc to various circuit points. Another voltage of +9.3 vdc is also supplied from damper board 51. As is understood in the art, the completed circuit illustrated in FIG. 5 comprises filter capacitors and resistors for signal isolation and noise suppression and the like. Terminals T11 and T12 are the connection points used if zone temperature sensor 42a is located in the zone instead of physically connected to the housing 11 of the bypass controller 10. Transistors Q1, Q2 and associated components are used to enable the sensor 42a.

Sensors 52, 53 and 54 are used to measure temperature of return air in duct 25a, temperature of the air in duct 25, and air flow in duct 25 respectively. The sensors 53 and 54 are placed upstream of the dampers 20, 37 supplying the various zones. The analog signal is sent from the damper control board 51 to the A/D converter in U4 via CH 1. U4 provides a digital word output representative of sensor data.

A damper control board 51 is illustrated in FIGS. 3, 7 and 8. U7 receives a synchronizing signal (DSYNC) and the damper control word (DPRDAT) from U4 via T8, T9 and T11. An input shift register 55 directs the word to data path select logic 56 where it is directed to HVAC unit control 17; motor control TS2 or sensor select enabling circuitry TS1. The sensor select circuitry 57 is used to enable one of several analog sensors, such as return air temperature detector 52. The sensor select 57 is not needed to enable damper travel limit sensor 22d. The travel limit sensor 22d is a digital Hall effect device that provides an output when the damper blade is at its maximum travel limit and another output when the blade is at any other position. Duct temperature and travel limit data are constantly monitored by the bypass controller. The sensor select logic 57 is used to select which of the optional analog detectors, such as return air temperature sensor 52, will be enabled. Sensor select 57 is responsive to data contained in the 8-bit damper command word. For reliability, the circuitry also has various watchdog and hardware redundance functions relating to hardware functioning and input clock signal integrity. Data verification logic 62 works in conjunction with latches 57, 60, 61 to provide a check of hardware redundancy. Input clock timeout 62, input data timeout 63 and reset logic 64 circuits are used with signal monitoring and reset functions.

Damper control board 51 includes opto-isolation U8 for the motor control relays to isolate inductive transients in the circuitry by isolating control power from operating power. The motor header TS2 is fed via hex inverter U9. U7 is clocked at 48 Khz from oscillator A3. The two other amplifiers A1 and A2 in U7a are part of the U7 monitoring system, including power supply availability. Terminal "G" on T12 provides analog sensor data to the U4 A/D converter. As is understood in the art, electrical circuitry, associated with relays must be designed to eliminate noise and signal transients associated with relay operation such as inductive kick, contact bounce, and the like. In addition, AC signal noise must be eliminated from analog sensor signal lines. Accordingly, isolation resistors and capacitors are used throughout the circuitry, as is the case with most electronic design. Also, in the preferred embodiment of the present invention, TS3 has terminals for supplying power of additional circuits. The design approach is to supply line power to the damper control board 51 which in turn can supply other various controls that might be used in the system via relay boards that are tailored for specific applications which are outside the scope of this invention.

Turning now to FIG. 9, air flow sensor 54 is comprised of an elongated hollow tube 70 having a closed end 70a within the duct 25 and an open end 70b at the opposite end portion and a plurality of small spaced holes 71 drilled through it within duct 25. The holes 71 in tube 70 are aligned parallel to the air flow in duct 25 and any pressure developed in the tube 70 is the result of static pressure in the duct 25 with the air velocity through holes 71 being disregarded. The open end 70b of tube 70 is angle-cut at 72 with edge 73 placed in contact with the surface of piezo-electric microphone VS1 which is located outwardly of duct 25. Higher air pressure in the duct 25 with reference to atmosphere will cause air pressure within the tube 70 to apply a force on microphone VS1 and sound waves to be generated thereby, and in the preferred embodiment the sound waves are about 3000-3500 Hz. This signal is converted to an electrical signal by microphone VS1 and is sent to processing circuitry set forth in FIG. 10, hereinafter described. The edge 73 of tube 70 is placed in physical contact with the surface of microphone VS1 for reasons of repeatability and reliability of the sensor instrument. The tube 70 is rigidly connected with respect to and through the wall of the duct 25. The microphone VS1 is movable through the use of a circuit board 74 to which it is attached by mounts 75. Movement of the microphone VS1 with respect to tube edge 73, i.e., by sliding the microphone VS1 in the vertical direction as illustrated in FIG. 9, allows for a sensitivity adjustment taking into account the surface and sound wave generating characteristics of microphone VS1. The electrical output from the circuit board 74 of microphone sensor VS1 is sent to controller processing circuitry via terminal 76.

Turning now to FIG. 10, the circuitry employed to convert the AC signal from VS1 to DC current is shown. An AC input signal from the microphone VS1 is amplified via amplifier A10 and associated components and passed to AC filter comprising amplifier A11 and associated components. The A11 filter is set for bandpass in the neighborhood of 3500 Hz which is the resonant mode of microphone VS1. Because of low signal levels from VS1 and the associated amplifier and filter, a precision rectifier comprising A12 and A13 is used instead of a full-wave bridge rectifier employing diodes. The diode voltage prop is unacceptably high for use in the present design. Precision zener D71 and associated components provide a highly regulated power supply for the rectifier.

Amplifier A14 and transistors Q10 and Q11 provide for the conversion of the DC voltage from the rectifier A12 and A13 into a DC current signal. Analog line switch Q13 is enabled by the damper command word via damper board 51 and is electrically connected as part of analog header TS1 via TS1a and TS1b. Amplifier A15 functions as a clamp to limit the maximum voltage input into A14 and thus prevent an input high enough into the A/D converter of U4 which could cause it to "roll-over" past its upper count limit and thus provide erroneous data.

The data received via air flow sensor 54 is handled by U1 as reference counts rather than as an exact quantitative analysis of actual air flow in the duct 25. This data corresponds to the relative air pressure in duct 25.

Bypass damper 50 is controlled via the damper board motor header TS2 by an 8-bit damper command word sent from U1. The damper 50 itself is operated by a precision stepper motor.

U3 is a 8 k read only memory containing the programs and algorithms for operating the bypass damper 50. U2 is an EEPROM which contains the calibration words for the air flow sensor 54, the return air temperature sensor 52 (if used), and the duct temperature sensor 53. It also contains air flow setpoint deadband, the damper open limit, the address data for the bypass controller and similar data.

U3 includes programs for reading and indicating various U2 software failures and various systems failures; programs for reading the operation of switches S1-S4, S5 and S6; programs for A/D conversion by the A/D converter in U4; and programs for handling communications including a cycle redundancy check (CRC) for use in detecting a collision and ignoring data that results therefrom. Also included are programs for data handling with the use of Hamming error checking codes and programs for monitoring system watch dog timers and the like.

10. Bypass Controller Operation

A. Bypass Damper Modulation

The bypass controller 10 continuously monitors reference counts from the air flow sensor 54 and makes a comparison to the setpoint that was established during programming. As the zone dampers 20, 37 in the system modulate closed, the reference counts measured by the air flow sensor 54 will increase. When the counts increase above the setpoint, the bypass controller 10 modulates the bypass damper 50 open. If the bypass controller 10 utilizes the deadband feature, the counts must rise above the setpoint by the deadband amount before the controller 10 will move the bypass damper 50 further open. Similarly, the reference counts must drop below the setpoint by the deadband amount before the damper 50 will move further closed.

B. Changeover Cycle

When the system changes from the cooling mode to the heating mode, or vice-versa, the bypass controller 10 will function to temper the residual conditioned air from the last cycle before delivering it to the zones. This function is called the "changeover cycle". During the changeover cycle, the bypass damper 50 will be held at its full-open position until the temperature of the supply air drops below a "cool-down" setpoint at the end of a heating cycle; or, rises above a "warm-up" setpoint at the end of a cooling cycle. When the setpoint is reached the changeover cycle ends, and the bypass controller 10 positions the bypass damper 50 to maintain the air flow setpoint, as programmed. The changeover cycle setpoints can be adjusted at the bypass controller 10. The cool-down setpoint can range from 72 to 87 F. and the warm-up setpoint from 55 to 70 F.

C. Fan Off

When the system fan cycles off, the bypass controller 10 positions the bypass damper 50 full-open. When the fan cycles back on, the bypass damper 50 will again modulate to maintain the desired airflow setting.

If the bypass controller 10 is not interfaced to the communication bus 31, it does not receive the message from the monitor thermostat 15 that the fan has cycled off, and will modulate the damper 50 to its full-closed position as the reference counts drop below the setpoint. The bypass damper will remain full-closed until the fan is started once again and the bypass controller 10 works to maintain the setpoint reference counts.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a system for providing conditioned air from a single HVAC unit to a plurality of zones through a duct system having a motor operated zone damper associated with each zone which modulates open and closed in response to a zone thermostat in each zone, the HVAC unit including a fan for discharging conditioned air into the outlet of the HVAC unit and a bypass duct communicating between the outlet and return air intake of the HVAC unit, a motor operated bypass damper, said bypass damper in said bypass duct having a damper blade movable between opened and closed positions and intermediate positions therebetween, the improvement comprising a programmable bypass controller connected to said motor of said bypass for controlling the operation of said bypass damper and thereby the movement of said blade thereof to selected positions, at least one said zone thermostat receiving information from each other said zone thermostat, said one thermostat communicating with said programmable bypass controller for selectively operating said bypass controller and its said damper in response to signals from said one thermostat, a sensor located in the air outlet of the HVAC unit downstream from said bypass duct and communicating with said bypass controller for providing information indicative of the air flow in said duct system, said bypass controller controlling said motor of said bypass damper to move its said damper blade more open to correspondingly compensate for the increase in the air flow in said duct system caused by one or more of said zone dampers modulating closed for diverting more air from the HVAC outlet to the HVAC inlet thereby maintaining the air supplied by the HVAC unit to said duct system downstream from said bypass dut generally constant.

2. In the system as defined in claim 1, wherein said bypass controller includes means indicative of the status of the air flow through said duct system and the position of said damper blade of said bypass damper.

3. In the system as defined in claim 1 wherein said bypass controller includes a plurality of programs and a data base, and said bypass controller being responsive to said programs and said data base.

4. In the system as defined in claim 3 wherein said bypass controller includes a microcomputer, said sensor providing information indicative of the amount of air flow in said duct system to said microcomputer, said microcomputer analyzing said information in conjunction with said programs and said data base prior to providing control signals to said bypass damper to modulate said damper blade toward opened or closed positions or intermediate positions therebetween in response to said air flow data.

5. In the system as defined in claim 4 wherein said bypass controller includes a second sensor for determining the temperature in the supply side of said duct system, said microcomputer analyzing said duct temperature in conjunction with said programs and said data base prior to providing control signals to said bypass damper to modulate said damper blade toward opened or closed positions or intermediate positions therebetween in response to said duct temperature data and in response to data received from said zone thermostat that the operating mode of the HVAC unit will be changed.

6. In a system for providing conditioned air from a single HVAC unit to a plurality of zones through a duct system having a motor operated zone damper associated with each zone which modulates open and closed in response to a zone thermostat in each zone, the HVAC unit including a fan for discharging conditioned air into the outlet of the HVAC unit and a bypass duct communicating between the outlet and return air intake of the HVAC unit, a motor operated bypass damper in said bypass duct having a damper blade movable between opened and closed positions and intermediate positions therebetween, the improvement comprising a programmable bypass controller including control means for operating said bypass damper, first circuit means responsive to input signals for establishing operating limits for said bypass damper and providing a first digital word output signal representative of said operating limits; second circuit means responsive to input signals indicative of the air flow in said system for providing a second digital word output signal representative of the air flow therein; third circuit means adapted to be coupled to a peripheral circuit means for receiving data from a peripheral circuit means an for providing a third digital word output signal representative of the information contained in such data; fourth circuit means responsive to output signals from said first, second, and third circuit means for providing fourth digital word output signals for operating said control means of said bypass damper; programmable logic means for providing digital word input signals to said fourth circuit means for selectively controlling said fourth circuit means; and logic means for selectively operating said bypass damper control means in response to respective said fourth digital word input signals from said fourth circuit means.

7. In the system as defined in claim 6 wherein said bypass controller includes means for providing information to peripheral circuit means, the information including any digital word signal associated with said first, second, and third circuit means and said programmable logic means.

8. In the system defined in claim 7 wherein said bypass controller further comprises a first sensor located in said outlet duct of the HVAC unit downstream of said bypass duct for measuring the air flow in said outlet duct and providing an output signal representative of the air flow in said duct said second circuit means including means responsive to said output signal from said first sensor for providing a second digital word output signal representative of the air flow in said outlet duct.

9. In the system defined in claim 8 wherein said first circuit means includes means responsive to input signals for establishing the desired air flow in said outlet duct and providing a first digital word output signal representative of the desired air flow therein.

10. In the system defined in claim 9 wherein said fourth circuit means is selectively controlled by said programmable logic means for comparing a digital word representative of the air flow in said outlet duct and a digital word representative of desired air flow in said outlet duct for providing a digital. word output signal to said logic means for operating said bypass damper to achieve actual air flow in said outlet duct substantially equal to the desired air flow in said duct.

11. In the system defined in claim 10 wherein said bypass controller includes means for providing control signals to peripheral circuit means for controlling the operation of an HVAC unit and the fan associated with the HVAC unit.

12. In the system defined in claim 11 wherein said programmable logic means includes a first program means such that said fourth circuit means provides control signals to said means providing control signals to peripheral circuit means for deactivating the heating and cooling functions of the HVAC unit, turning on the fan associated with the HVAC unit, and opening all zone dampers, and causing said logic means to close said bypass damper; said fourth circuit means;entering data indicative of the air flow in said duct system into said programmable logic means; said fourth circuit means provides control signals to said means providing control signals to peripheral circuit means for closing all zone dampers, said programmable logic means providing signals to said logic means for operating said bypass damper open for maintaining air supplied by the fan to said duct system downstream from said bypass duct generally constant.

13. In the system as defined in claim 10 further comprising a second sensor located in said bypass damper and supply side of said duct system for determining the temperature therein and providing an output signal representative of the temperature in the outlet duct, said second circuit means responsive to said output signal from said second sensor and providing a digital word output signal representative of the duct temperature.

14. In the system as defined in claim 13 wherein said fourth circuit means is selectively controlled by said programmable logic means for comparing a digital word representative of actual temperature in said outlet duct and predetermined setpoints established by said first circuit means.

15. In the system as defined in claim 14 wherein said programmable logic means includes a first program means such that when a signal from a peripheral circuit means is received by said third circuit means indicative that the HVAC unit is to be operated in a mode different from the existing mode of operation, said fourth circuit means provides a signal to said logic means to operate said bypass damper control means to position said bypass damper in the maximum open position until duct temperature is within said predetermined setpoints as established by said first circuit means and to then operate said bypass damper control means according to said desired air flow in said duct.

16. In the system defined in claim 15 wherein said programmable logic means includes a second program means such that when a signal from a peripheral circuit means is received by said third circuit means indicative that the fan associated with the HVAC unit has been turned off, said fourth circuit means provides a signal to said logic means to operate said bypass damper control means to position said bypass damper in the maximum open position when the fan is off and to then operate said bypass damper control means according to said desired air flow in said duct when the fan is operating.

17. A method of monitoring and controlling the amount of air recirculated through a bypass duct having a motor operated bypass damper therein between the supply and return ducts of a single HVAC unit supplying air downstream therefrom to a plurality of zones through a duct system having a motor operated damper in each zone controlled by a thermostat comprising the steps:
  a. sensing the airflow in the duct system downstream of the bypass duct,
  b. converting the sensed airflow into signals,
  c. supplying the signals to a microcomputer, and
  d. controlling from the microcomputer in conjunction with its programs and the signals supplied to the microcomputer in step c. of the bypass damper to divert more or less air through the bypass duct to maintain the airflow supplied by the HVAC unit to the duct system downstream of the bypass duct and prior to any outlets to any zones generally constant.

18. The method of claim 17 further comprising the steps of:
  e. supplying signals to the microcomputer indicative of a mode of operation different than the present mode for the HVAC unit different than the present mode of operation,
  f. sensing the temperature of the air in the supply duct,
  g. converting the temperature data to signals,
  h. providing the temperature signals to the microcomputer,
  i. operating the motor of the bypass damper to a full open position until the supply duct temperature is within limits established by the programs of the microcomputer, and
  j. thereafter operating the bypass damper in accordance with step d.

19. The method of claim 18 wherein step i. includes maintaining all dampers in the present mode until the bypass damper begins moving in accord with step j. and then allowing all zone dampers to be positioned appropriately for the different mode.

20. A method of changing modes from a heating mode to a cooling mode or from a cooling mode to a heating mode when monitoring and controlling the amount of air recirculated through a bypass duct having a bypass damper between the supply and return ducts of a single HVAC unit supplying air via the supply duct to a plurality of zones comprising the steps:
  a. determining that a first mode requirement of the HVAC unit has ended,
  b. determining that a second mode of the HVAC unit is required,
  c. positioning the bypass damper in the bypass duct full open until supply air temperature is generally in accord with the second mode, and
  d. moving the bypass damper to its selected positions during normal operation according to air flow requirements.

21. A method of changing modes from a heating mode to a cooling mode or from a cooling mode to a heating mode when monitoring and controlling the amount of air recirculated through a bypass duct having a bypass damper between the supply and return ducts of a single HVAC unit supplying air via the supply duct to a plurality of zones through a duct system having a motor operated damper in each zone controlled by a thermostat comprising the steps:

a. determining that a first mode requirement of the HVAC unit has ended,
b. determining that a second mode of the HVAC unit is required,
c. positioning the bypass damper in the bypass duct full open until supply air temperature is generally in accord with the second mode,
d. maintaining all zone dampers in the first mode during step c.,
e. moving the bypass damper to its selected positions during normal operation according to air flow requirements,
f. allowing all zone dampers to be positioned appropriately for the second mode when step e. has begun.

* * * * *